Feb. 14, 1956   W. LIMBERGER   2,734,690
REVERSIBLE WINDING DEVICE
Filed Feb. 9, 1953

INVENTOR
Walter Limberger
by Fairman & Beaman
Attorney

United States Patent Office 2,734,690
Patented Feb. 14, 1956

2,734,690

REVERSIBLE WINDING DEVICE

Walter Limberger, Hamburg, Germany, assignor to Messrs. Lumoprint Zindler K. G., Hamburg, Germany Application February 9, 1953, Serial No. 335,743

Claims priority, application Germany February 9, 1952

4 Claims. (Cl. 242—55)

This invention relates to a device for processing photographic, light-sensitized, coated material in strip form, such as roll films or the like, in a solution for the purpose of developing, fixing, or rinsing. The photographic material which can be treated in the device of this invention must be rolled strip stock but may include any base material coated with a photographic agent. Such material will be referred to hereinafter as film material or film.

Known devices for processing such carriers of a photographic coating include mechanisms by which the strip of material to be processed is moved back and forth between two rotatably mounted reels by winding and unwinding the film alternately on the respective reels. For this repeated winding operation in opposite directions, the reels are driven by a mechanism which at a certain instant rotates one reel for winding and the other for unwinding, and at a subsequent instant vice versa.

In one of such disclosed devices for automatic actuation of the reels, a driving mechanism or a clutch is interposed between the drive proper and the reel, whereby reversing from one direction of rotation to the other is initiated by the tension produced in the roll film at the moment it is completely wound on one reel and unwound on the other. Apparatus based on this principle have one drawback which is that generally considerable pull is exerted on the film before it can cause reversal of movement of the driving mechanism or of the clutch. Such high stresses on the film works hardship on the photographic coating in that it may be separated from its base or may receive cracks and scratches. Moreover, known devices of this type are relatively complicated, are liable to get out of order, and are rather expensive.

In another known device an attempt has been made to cause reversing of drive and clutch by mechanical means which become effective when the last turn of the film material clears the reel. However, such reversing actuators for clutch or drive motor must of necessity be submersed with the reel in the solution. This fact is a considerable disadvantage, because only small forces can be released by lifting the last turn of film from the reel and consequently the actuating means can be built in an only small and rather fragile manner so that they are susceptible to mechanical injury. Furthermore, the functioning of such actuators is liable to be impaired by contamination from the processing solution.

It is an object of this invention to overcome the shortcomings enumerated above and to provide a simple reversing means for the set of reels in a film processing device, which means is of simple construction, reliable in service, and which does not mar the film or its coating.

According to this invention, reversing is effected by change-over of the drive from one reel to the other by means of an actuating member mounted for swinging movement between two limit stops, whereby swinging of the lever in alternate direction is initiated by suitable pusher means, one at each end of the strip of film, and is completed by a spring-actuated snap-action device communicating with said actuating member. This principle results in reversing means for photographic strip material while being treated in a solution, which means responds to very small forces and is so simple in construction that it operates without any trouble. Especially those parts of the mechanism which must operate while submerged in the solution are of such rugged construction that they cannot be hampered in their functioning by contamination accumulating thereon. The force required for initiating the reversing action is so small that it does not harmfully effect the photographic coating carrier even if the latter is very fragile.

In a preferred embodiment of this invention, the pusher means to be attached to the film ends comprise flexible extension or stretcher portions, which by themselves or by the means used for fastening them to the film serve as actuators for initiating swinging movement of the actuating member. Such extension or stretcher portion is preferably of rubber, for instance, a strip rubber, and is somewhat thicker than the film itself. The actuating member is preferably provided with a slot which is so wide that the film can pass freely but not the extension or its fastening means. In this manner, the front edges of the extensions or the fastening means, being not able to enter the slot, push along the actuating member and thus start mechanical actions which finally result in change of direction of rotation of the reels and reversal of film travel.

The snap-action device, previously referred to, can take several forms and it is to be understood that this invention is not limited to a particular construction of this device which generally causes no difficulty since, in accordance with this invention, it operates away from the processing solution.

Other objects and advantages of the invention will become apparent from the following detailed description of a preferred embodiment in which, as a matter of completeness but not in a limiting sense, also the construction of a preferred snap-action device is described. The description to be read in connection with the accompanying drawing, which shows said preferred embodiment in simplified representation and in which.

Figure 2:
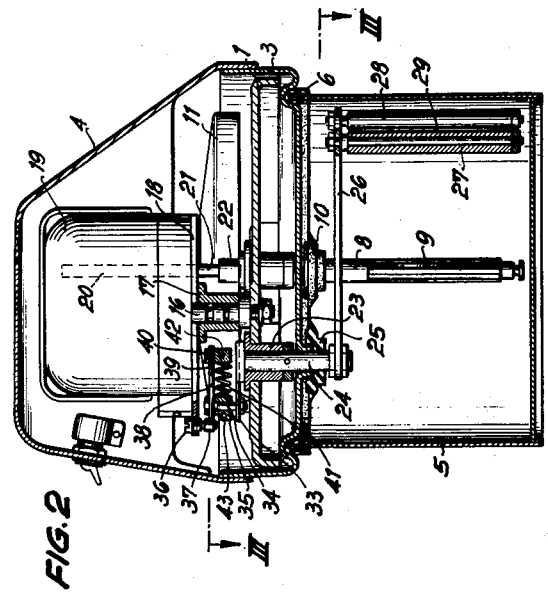
Fig. 2 is a section taken on the line II—II of Fig. 1.

Referring to the drawing, the main structure of the device consists of a supporting plate 1 arranged in a casing with bottom 3 and cover 4, which three parts are held in assembled relation by bolts 2 connected with a handle 32. This assembled unit is provided with handles and a suitable recess around the rim of bottom 3 to be laid on a container 5 serving to receive a film processing solution such as developer, fixing bath, or rinsing water. The rim of container 5 is preferably provided with a cuff 6 of flexible material for sealing the joint between casing and container.

Mounted in spaced relation and for rotation in supporting plate 1, there are two stub shafts 7, 8 which extend through holes in bottom 3 into the container 5 where they have square portions 9 for receiving in a well-known manner reels on which is wound the photographic material to be processed. Gaskets 10 are provided for sealing the crevices around stub shafts 7, 8 in bottom 3. The upper portions of shafts 7, 8 project above supporting plate 1 where the drive means are arranged, which consist chiefly of friction drives. A large friction disk 11 is secured to the upper end of shaft 8, whereas shaft 7 carries a small pinion 12, which meshes with a pinion 13 of similar size secured to an intermediate shaft 14 also journaled in supporting plate 1. This intermediate shaft 14 in turn carries a large friction disk 15 which is of same diameter and construction as friction disk 11. The drive of stub shaft 7 through this reversing set of pinions 12—13 is necessary in order to obtain correct rotation of the reels for the successive winding and unwinding operation as will become clear later.

Midway between the friction disks 11, 15 on a line at right angle to a connecting line between the axes of shafts 8 and 14, i. e. between the center points of friction disks 11, 15, and somewhat offset from this connecting line, there is secured in supporting plate 1 a bushing 17, in which a stud 16 is pivotally mounted, which in turn carries a base plate 18 with the electric drive motor 19 fixed thereto. Thus the motor with its base plate can swing in a horizontal plane about pivot 16, and the vertical motor shaft 21, being offset from pivot point 16, extends downward between the friction disks 11, 15 on the connecting line between their centers and thus at the point of smallest distance between said disks. The shaft extension 21 of motor 19 carries a friction wheel 22, and it will be clear that friction wheel 22 can be brought into engagement either with disk 11 or with disk 15, depending on in which direction the motor is swung on its pivot 16. The location of motor pivot point and shaft extension with friction wheel can best be seen in Fig. 3, and the wheel 22 is shown in engagement with disk 11 in the Figs. 1 and 3.

Located on the same line as pivot 16 but still farther off from the connecting line between the centers of friction disks 11 and 15, there is a bushing 23 secured in supporting plate 1 accommodating a rotatable shaft 24 which extends downward through bottom 3 and carries rigidly at its lower end an actuating lever 26. The crevice occurring where shaft 24 passes through bottom 3 is sealed by gasket 25. Actuating lever 26 carries at its free end two guide rollers 27, 28, which are arranged in spaced relation to each other and leave a slot 29 between their peripheries for a purpose hereinafter to be described. The reels to be carried by the stub shafts 7, 8 (one of the reels is shown at 30 on shaft 7) are provided each with an axial slot in its hub for insertion of an extension or stretcher portion serving as pusher means and being in the form of a rubber strip 31. Such strip can be readily secured in the slot, for instance, by inserting the doubled-up rear edge of the strip into the slot where it is then held by wedging action.

The width of slot 29 between guide rollers 27, 28 is so chosen that the film or other light-sensitized material can be drawn through it without substantial resistance, but that the rubber strip 31 cannot enter the slot. When now the film is unwound from one reel and wound onto the other, passing thereby through the slot between the guide rollers, it will be clear that on unwinding, when one end of the film advances toward the guide rollers, the thicker strip cannot pass, will exert a slight push against the guide rollers and will consequently move actuating lever 26.

Secured to the other end of shaft 24 and located above supporting plate 1 is a short lever 33 which, although positioned in another plane, may be considered as a rearward extension of actuating lever 26. Lever 33 carries at its free end a pin 34 serving as a pivot for guide block 35. Another pin 36 is secured in a rearward extension of motor base plate 18. This pin 18 is in alignment with the pivot 16 of plate 18 and the motor shaft extension 21, and is somewhat farther off from the connecting line between the centers of the two friction disks 11, 15 than the pin 34. Interposed between the pins 34 and 36 is a snap-action device which causes that when lever 33 swings in one direction, the motor base plate 18, acted on through pin 36, swings with a snap in opposite direction, thereby disengaging frictional contact of the friction wheel 22 with one friction disk and engaging it with the other. As already mentioned, any known snap-action device, such as generally applied in snap-action switches or the like, can be employed for this purpose. The construction illustrated in the drawing includes, besides the guide block 35 pivoted on pin 34, another guide block 37 pivoted on pin 36. Guide block 37 is provided with a horizontally extending stud 38 which is slidably guided in guide block 35 and has a threaded extension 39 which threadably engages a counterblock 40. Counterblock 40 and guide block 37, which two parts are adjustably but otherwise unmoveably connected with each other by stud 38, on one hand, and guide block 35, on the other hand, are connected through two tension springs 41, one at each side of stud 38. These springs are anchored at one end to block 40 by pins 42, and at the other end to block 35 by pins 43.

The friction disks 11, 15 are preferably provided with a light friction brake (not shown) so that the reel to be unwound offers a certain resistance to the film and keeps it tense. The amount of swinging motion of lever 33 and therewith also of actuating lever 26 is limited by stops 44, 45 secured in supporting plate 1.

Figure 3:
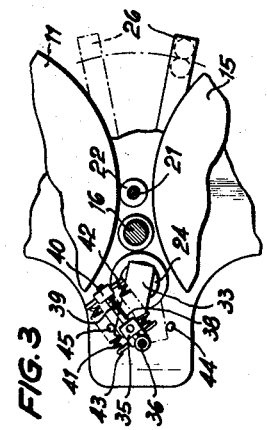
Fig. 3 is a partial section taken on the line III—III of Fig. 2 and representing a fragmentary top view of the main supporting plate of the device with the construction elements mounted thereon.
Figure 1:
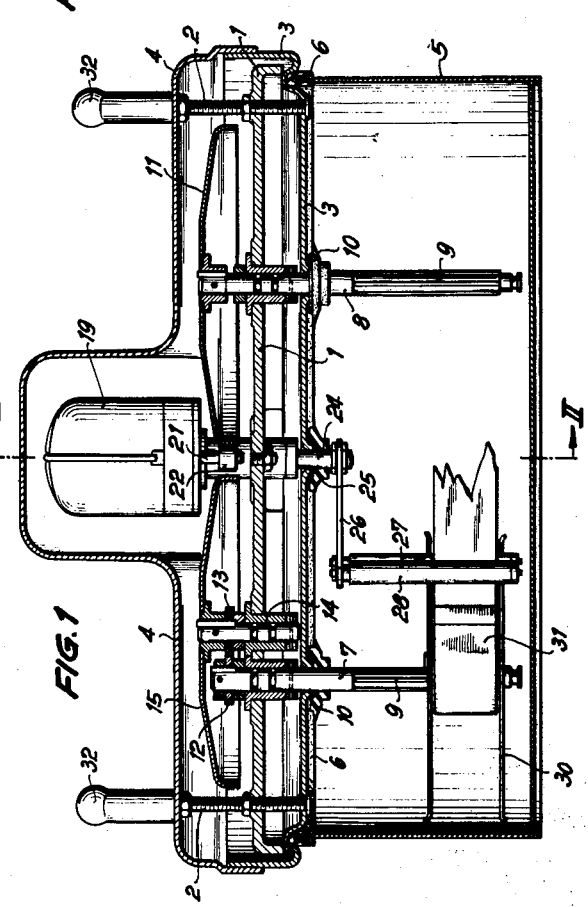
Fig. 1 is a longitudinal section through a film processing device according to the present invention.
Figure 4:
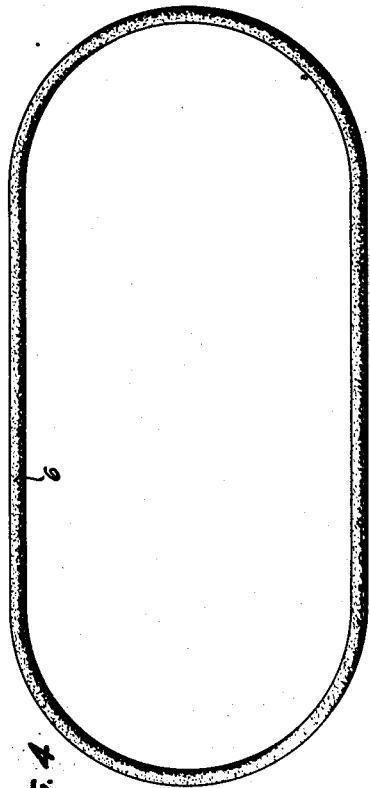
Fig. 4 is a view on a sealing means used for the device of Figs. 1–3.

It has already been mentioned and can be seen that as shown in Figs. 1 and 3, the driving friction wheel 22 is in engagement with friction disk 11, whereby the actuating lever 26 assumes a position swung over toward reel-carrying stub shaft 7. This is the position during operation when the film is being unwound from the reel on shaft 7 and is wound onto the reel on shaft 8. The film passes thereby through slot 29 between guide rollers 27, 28. The length of rubber strip 31, interposed between film and reel hub, is so chosen that its front edge reaches slot 29 when practically film movement in this direction must come to an end. Then this front edge, being unable to enter the slot, exerts a push against actuating lever 26 and starts swinging it, as viewed in Fig. 3, in counter-clockwise direction. Since lever 26 is rigidly secured to shaft 24 with lever 33, such movement causes that lever 33 is raised off stop 45 against which it had rested. As further consequence of this movement, guide block 35, being pivoted to lever 33, affects stud 38 together with block 37 to begin swinging about its pivot 36, whereby the tension of springs 41 increases. Initially during this action, pin 36 and the motor base plate 18, in which this pin is secured, remain at rest and the distance between the blocks 35 and 40 increases. Such movement continuous into the dead-center position in which the distance between the blocks 35, 40 and the tension of the springs 41 has reached a maximum. Passing dead center, the mechanism flaps over, the springs give off a portion of their tension, and the blocks 35, 40 recede again toward each other. Flapping over of the mechanism causes springs 41 to exert pressure in another direction against pin 36 through block 37 and stud 38, with the result that the motor base plate with motor swings with snap-action into its other end position in which friction wheel 22 engages the other friction disk 15. The actuating lever 26 takes now a position as indicated in Fig. 3 in dotted lines, and the lever 33 rests against stop 44. The driving power is transmitted through friction disk 15 and intermediate pair of pinions 12, 13 to stub shaft 7 which, turning now in opposite direction, rewinds the film onto the reel set thereon. After the film has been unwound from the reel on shaft 8, a similar rubber strip 31 inserted here (not shown) causes snap-action of the reversing mechanism in opposite direction and the same cycle of operation repeats itself anew.

It is apparent that various changes may be made in certain details of the described construction and it is therefore to be understood that the embodiment herein described and illustrated in the drawing is to be considered as an example only and not in a limiting sense.

What I claim is:

1. In a web feeding and reversing mechanism, a stationary supporting member, a first and a second spool rotatably supported in spaced relationship on said stationary supporting member and each adapted to receive the one end of said web, a first and a second friction disk both rotatably supported in spaced relationship on the upper side of said stationary supporting member, a first driving connection between said first friction disk and said first spool, a second driving connection between said second friction disk and said second spool, such driving connections being so designed that the direction of movement of said first spool being opposite to the direction of movement of said second spool when driven by its friction disk respectively in the same direction, a pusher member rotatably supported on the lower saide of said stationary supporting member, two abutments provided between each of the ends of said web and said spools and adapted to engage said pusher member, a movable supporting member rotatably supported on the upper side of said stationary supporting member, an electric motor arranged on said movable supporting member for running in the same direction, a friction wheel drivably connected with said motor, and a two position spring-tensioned snap-action device drivably connected with said pusher member and connected to said movable supporting member to actuate the same for bringing said friction wheel in driving engagement either with said first or said second friction disk.

2. A web feeding and reversing mechanism comprising a pair of spaced spools upon which opposite ends of a web are attached for winding and unwinding, means for supporting and rotating said spools about spaced fixed vertical axes for winding the web upon first one of said spools and then upon the other, a motor for alternately rotating said spools in opposite directions, means supporting said motor for swivel movement about a fixed vertical axis, a friction drive wheel on said motor and rotated thereby about a vertical axis and horizontally offset from said vertical axis about which said motor is swiveled so as to have bodily arcuate movement in a horizontal plane upon swivel movement of said motor, a pair of friction discs supported for rotation about vertical axes and having peripheral portions thereof disposed in the plane in which said friction wheel has arcuate movement, means gearing said discs to said spools to drive said spools from said discs, lever mechanism supported for swivel movement about a vertical axis, said mechanism having a relatively long feeler arm portion and a relatively short actuator arm portion, a linkage between said arm portion and motor supporting means for imparting swivel movement to said motor upon swivel movement of said lever mechanism to bring said friction wheel into driving engagement with one or the other of said friction discs, means located upon the outer end of said relatively long feeler arm portion for free running clearance between the ends of a web wound upon said spools, means located upon said spools to which the ends of the web are connected and which means is movable with said web ends, said last means being engageable with said means upon said feeler arm portion upon completion of the winding of the web upon either of said spools for imparting movement to said lever mechanism to swivel said motor to shift said friction wheel from one disc to the other to rewind the web, said linkage being in the form of over center snap action structure for accelerating the movement of said lever from one of its positions of rest into its other position and for holding said friction wheel in contact with the selected friction disc.

3. A web feeding and reversing mechanism as defined in claim 2 wherein the means on the outer end of said feeler arm portion is in the form of guide rollers spaced to form a slot wide enough to pass the web unwinding from one of said spools and winding upon the other but not wide enough to permit passage of said means for imparting movement to said lever mechanism.

4. A web feeding and reversing mechanism as defined in claim 2 wherein said means for actuating said lever mechanism is in the form of flexible strips anchored at one end to said spools and at the opposite end to the web.

References Cited in the file of this patent

UNITED STATES PATENTS

| | | |
|---|---|---|
| 1,945,571 | Samaras et al. | Feb. 6, 1934 |
| 2,300,755 | Williams | Nov. 3, 1942 |
| 2,356,421 | Morse | Aug. 22, 1944 |
| 2,537,260 | Dale | Jan. 9, 1951 |
| 2,583,385 | Miller | Jan. 22, 1952 |